(12) United States Patent
Barthel et al.

(10) Patent No.: US 6,731,800 B1
(45) Date of Patent: May 4, 2004

(54) METHOD FOR COMPRESSING SCANNED, COLORED AND GRAY-SCALED DOCUMENTS

(75) Inventors: Kai Uwe Barthel, Berlin (DE); Simon McPartlin, Berlin (DE); Michael Thierschmann, Berlin (DE)

(73) Assignee: Algo Vision Lura Tech GmbH, Berlin (DE)

( * ) Notice: Subject to any disclaimer, the term of this patent is extended or adjusted under 35 U.S.C. 154(b) by 0 days.

(21) Appl. No.: 09/456,875

(22) Filed: Dec. 8, 1999

(51) Int. Cl.[7] .................................................. G06K 9/34
(52) U.S. Cl. ........................ 382/176; 382/239; 358/464
(58) Field of Search ................................. 382/170–180, 382/232–240; 358/450–464

(56) References Cited

U.S. PATENT DOCUMENTS

| 4,916,744 A | 4/1990 | Watanabe |
| 5,371,606 A | 12/1994 | Katayama et al. |
| 5,778,092 A | 7/1998 | MacLeod et al. |

FOREIGN PATENT DOCUMENTS

| EP | 0 320 755 | 6/1989 |
| EP | 0 325 372 | 7/1989 |
| EP | 0448226 A2 | 9/1991 |
| WO | 96/24114 | 8/1996 |

OTHER PUBLICATIONS

1999, Compression of Compound Documents by Richard L. de Queiroz, Xerox Corporation, XP–000904843.

*Primary Examiner*—Jingge Wu
(74) *Attorney, Agent, or Firm*—Jordan and Hamburg LLP

(57) ABSTRACT

Scanned, colored and gray-scale documents are compressed. The digital image of the scanned document is divided into three image planes. These image planes are a foreground image, a background image and a binary mask image. The mask image describes which areas of the document belong to the foreground and which to the background. Components of the foreground are text and graphic elements. The color and intensity of these foreground areas is described by the foreground image. The background areas include the text background as well as the pictures contained in the document. The color or brightness information of the background as well as the images contained in the document are contained in the background image. Each of the three images is coded separately with a suitable image coding method. For the decoding, the document is assembled once again from the foreground and background images. In this connection, the binary mask image describes the areas in which the reconstructed document is to be generated from the foreground image or from the background image.

14 Claims, 11 Drawing Sheets

BLOCK DIAGRAM

BLOCK DIAGRAM
FIG.1

FIG. 2

DETAILED REPRESENTATION OF THE STEPS FOR
THE TEXT DETECTION/SEGMENTING

FIG.3

DETAILED REPRESENTATION OF THE STEPS TAKEN TO
DETERMINE THE FOREGROUND IMAGE

FIG.4

DETAILED REPRESENTATION OF THE STEPS FOR
DETERMINING THE BACKGROUND IMAGE

FIG.5

FIG.6 Original Document

FIG. 7 Quantizing image

104 Der Kinoschreck
Die indiskrete Website eines Texaners läßt Hollywoods Filmindustrie zittern 110 Fußball 2000
Minisender für die Spieler, Reporter auf dem digitalisierten Spielfeld – die Software-Ideen einer israelischen Firma bringen Fußball-Übertragungen in Schwung 112 Tod eines Hackers
Karl Koch war jung und ein Computergenie. Aus seinem Leben und Sterben hat ein deutscher Regisseur jetzt einen Film gemacht 118 Internet-Paparazza
Eine hübsche Blondine geht jede Nacht in New York auf Promi-Jagd. Die Bilder, die sie macht, werden live via Internet übertragen 120 Das Ende der Körper
Für die nächste Evolutionsstufe sollte sich der schwächliche Mensch mit den perfekten Maschinen verbinden – glaubt Stelarc, ein Künstler aus Australien 134 Die Zukunft des Internets
Die sechs wichtigsten Entwicklungen im Überblick wissenschaft·technik

140 GPS geprüft
Mobile Navigatoren – getestet zu Lande, zu Wasser und in der Luft 146 Suche nach E.T.
Seit Jahren forschen Wissenschaftler nach außerirdischem Leben. Dank einer neuen Software könnte Ihr privater Rechner bei der Suche helfen 148 Die PC-Piloten
Cockpit im Arbeitszimmer, Wochenenden in der Probekapsel – immer mehr Deutsche heben am Flugsimulator ab 158 Samenspende aus dem Netz
In Kalifornien kann frau online den richtigen Partner für die künstliche Befruchtung auswählen 160 Der Rechner als Prügelknabe
In Schwerin schlagen die besten Boxer Deutschlands auf ein Kissen ein – der Computer wertet alles aus 168 High-Tech zum Träumen
Die heißesten Produkte für den Herbst rubriken read me 3  monitor 8  fragebogen 16
modernste zeiten 93  scanner politik/
wirtschaft 94  Impressum 95
useless information 109  scanner
kultur/medien 126  spieltrieb 1
scanner wissenschaft/technik 174
konr@d-Guide Erotik 1    mailbox 19
zurück in die zukunft 196

FIG.8 Segmenting result

FIG.9 Foreground image

FIG.10 Background image

FIG. 11 Decoded reconstruction

METHOD FOR COMPRESSING SCANNED, COLORED AND GRAY-SCALED DOCUMENTS

The invention relates to a method for compressing scanned, colored and gray-scale documents, the digital image of the scanned document being divided into three image planes. These image planes are a foreground image, a background image and a binary mask image. The mask image describe which areas of the document belong to the foreground and which to the background. Components of the foreground are text and graphic elements. The color and intensity of these foreground areas is described by the foreground image. The background areas include the text background as well as the pictures contained in the document. The color or brightness information of the background as well as the images contained in the document are contained in the background image. Each of the three images is coded separately with a suitable image coding method. For the decoding, the document is assembled once again from the foreground and background images. In this connection, the binary mask image describes the areas, in which the reconstructed document is to be generated from the foreground image or from the background image.

In the case of a suitable division of the document into the three image levels described, clearly better compression results can be obtained with this representation than with image coding methods which code the document as a whole. The invention describes a new method for determining the binary mask image as well as a method for the efficient division of the original document into the foreground and background images. No special assumptions are made regarding the nature or construction of the document.

STATE OF THE ART

Documents, which are scanned with high resolutions, require much memory for the resulting digital image data. For example, a 300 dpi scan of a colored A4 page takes up approximately 25,000,000 bytes and a colored 600 dpi scan takes up 100,000,000 bytes. Documents with amounts of data of this order of magnitude can be archived uncompressed only in small amounts. Transfer over networks with low transfer rates is practically impossible.

Lossless compression methods, such as the lossless mode of the JPEG standard (JPEG-LS) or Lempel-Ziv Welch (LZW) only make very small compression factors possible. Higher compression factors are possible only through the use of loss-affected compression methods. The DCT-based "JPEG method" of the Joint Pictures Expert Group is considered to be the standard method. However, neither the JPEG method nor the newer, better wavelet-based compression method can be used for the high-grade compression of scanned documents. These strictly image compression methods presume the statistics of typical image signals, which are characterized by a high local correlation. Since these assumptions do not apply to scanned documents, the text portion of the documents is greatly changed at high compression factors, so that it becomes impossible to read the text. At the present time, documents for archiving are usually scanned in the binary mode and compressed with the CCITT fax compression standard "Fax Group 3" or "Fax Group 4". In general, the readability is retained by these strictly binary compression methods. However, the brightness and color information of the image portions is lost entirely.

The Mixed Raster Content standard (MRC) (ITU recommendation T.44), which is presently in the planning stage, is a new attempt to avoid these problems. According to this standard, it is possible to divide a document into regions of different local resolution, which can be coded in different ways. One mode of the MRC standard is a multi-layer coding mode, which provides for a division of the document into three previously described planes. However, in the MRC standard, exclusively the decoding process is fixed unambiguously. The method of the division of the documents into three image planes during the coding is not specified. A method, which uses this multi-layer coding mode, is described in U.S. Pat. No. 5,779,092. However, the method specifies conditions, which are not applicable in many of the documents, which are to be processed, namely that the shape of the images is assumed to be rectangular. No provisions are made for detecting text with background images or for the presence of text within images. Furthermore, the document background basically must be white or bright.

It is an object of the invention to make possible the compression of scanned documents without being restricted by the nature of the original copies, such as a bright background, rectangular illustrations and precise separation of image and text components. Moreover, the expenditure of computing time and the use of memory shall be reduced clearly. Furthermore, different classes of documents and images shall be compressed according to a uniform method by way of a few control parameters.

SUMMARY OF THE INVENTION

A new method for compressing scanned documents is introduced. Starting out from the representation of the document in three planes—foreground image, background image and mask image—the basic course of the compression method is presented in the following:

To begin with, a locally variable threshold value image is generated from the defined reduced original document with an adaptive threshold method, and brought back once again to the size of the original document. The original image is subsequently quantized with this threshold value image in order to produce a bitonal quantization image. By means of this quantization image and the original image, a text detection (segmenting), which divides the document into foreground and background regions, is subsequently carried out. In so doing, regions such as text and graphic elements are assigned to the foreground image, the text background and the images of the background image. The result of this segmenting is filed in the binary mask image. The binary mask image has the same size and resolution as the original image. Subsequently, a foreground image, which describes the color of the foreground regions, is produced from the original image and the mask image. Compared to the original image, this foreground image has a reduced resolution. After that, the background image is produced once again with a reduced resolution from the complement of the bitonal mask image and the original image. Subsequently, the three images are coded in each case with a suitable image coder.

DESCRIPTION OF THE INVENTION

The quantization or binarizing of the original document takes place in two steps. To begin with, a locally variable threshold value is determined with an adaptive method. The comparison of the gray value representation of the original document with this threshold value supplies the binary quantizing image.

If the original document exists as a colored document, it is converted, to begin with, into a gray scale image and two color difference component images. The gray scale image is used for determining the locally variable threshold value image. The gray scale image, which normally exists with a resolution of 150 to 600 dpi, is reduced to a suitable size. For this purpose, a low-pass filtering with subsequent sub-sampling is carried out. Local distortions in the original scan, such as noise or dither and raster effects are decreased by the reduction.

A local dynamics analysis is carried out next. For this purpose, the reduced gray scale image is subjected to a minimum filtration and a maximum filtration. The difference between the maximum image and the minimum image produces a dynamics image, which supplies indications regarding regions with strong edges, such as text regions.

In the next step, the dynamics image is compared with a minimum dynamic, which can be specified externally and controls the sensitivity of the quantizing and of the text detection. In regions, the dynamics of which exceed this minimum value, a quantizing threshold value is determined from half the sum of the minimum image and the maximum image. In regions, the dynamics of which are too low, the quantizing threshold value initially is set equal to zero.

Since the threshold values, so determined, are subject to strong local fluctuations and their maxima in each case are to be found in the brighter region of an edge, all threshold values, not equal to zero, are averaged as a next step. The averaged threshold values are now extended to the adjoining pixels.

In the last step, all remaining pixels, for which there is not yet a threshold value, are filled in with a value, which is formed from the average of all values not equal to zero. The newly calculated values are written back directly in the threshold value image. As a result, it is possible to determine a threshold value for all pixels of the image with only one pass.

Since the threshold value image, now determined, is smaller than the original document, it must be brought back to the original size for quantized. Enlargement takes place by means of bilinear interpolation. As a result, during the quantizing subsequently carried out, there are fewer disorders than in the case of a simple enlargement by pixel repetitions. This leads to better coding results for the binary mask image, produced in the following.

The binary quantizing image produced is the starting point for the second area of the inventive method, the text detection. It is an object of the text detection (segmenting) to produce the binary mask image, which describes a pixel-by-pixel assignment to foreground and background regions. Text and graphic structures, which were detected as belonging to the foreground, are represented in black in the binary mask image, whereas background regions are represented in white.

Pursuant to the invention, the segmentation treats all connected regions of the same value in the quantization image as possible candidates for foreground components. For this purpose, their affiliation with the foreground is investigated according to diverse criteria. The regions, segmented as foreground, are entered in the binary mask image. During the segmenting, the mask image initially is not yet binary and can assume the states of "not yet investigated", "foreground", "background" and "hole".

As a first step, all connected regions of the quantized image are identified. For this purpose, a four-fold neighborhood is used for documents with a high resolution and an eight-fold neighborhood for documents with low resolutions.

When the regions are determined, a size filtration is carried out. Depending on the resolution of the document, there is a minimum size and a maximum size, the limits of which must not be exceeded. Regions, which lie in the permissible range, are investigated further. All other regions are discarded.

The next step is an border detection. For this purpose, all edge pixels of the region are investigated with the help of known edge filters, the edge activity being determined by the absolute value of the filter response.

In order to be able to differentiate raster effects from noise more effectively, the edge activity determined is compared with a minimum activity value. If the edge activity is less than this minimum value, it is set equal to zero.

In a further step, the average edge activity and the maximum edge activity is now determined for the border of the region and, in addition, the variance is determined for the interior of the region.

The next step is to check whether the average edge activity as well as the maximum edge activity lie above the specified minimum values and, in addition, whether the variance of the inner region does not exceed a maximum value.

In the event of a positive result, the actual region is classified as a foreground region and entered as such in the mask image. In the event that this region touches a different region, which has already been classified as foreground, it is entered as a "hole". If the test is negative, it is a background region, which is also entered into the mask image.

After the classification, the mask image is binarized. For this purpose, the foreground regions are set at black and all remaining regions at white.

The segmenting can be carried out in four different modes. The previously described procedure corresponds to a first mode, which is capable of detecting normal and inverse text. For many documents, such as simple letters, in which there is no inverse text, a second mode can be used, which investigates only the black connected regions of the quantized image. A third mode is meaningful for documents, which are extremely difficult to segment, such as maps. All black regions of the quantizing image are automatically assumed to be foreground regions here. By these means, satisfactory coding results can be achieved even with documents, which are difficult to segment. The fourth mode consists of classifying all pixels directly as background pixels; this is meaningful when coding strictly image documents.

In the following, the foreground and background images are determined. For this purpose, two aspects must be fulfilled. On the one hand, the foreground image and the background image should represent the intensities of the original scan as well as possible, so that visual artifacts do not result even if the segmenting has been defective. On the other hand, the structure of the resulting images must be as simple as possible, in order to ensure efficient coding.

The reduced foreground image is produced by means of the binary mask image and the original image.

Initially, all regions, belonging to the foreground, are identified in the binary mask image. Since the border values of the regions have defective intensities or colors, the foreground regions are thinned basically by one pixel. However, at least the skeleton of the region is retained.

The original image and the thinned binary mask image are divided into blocks. The edge length of the blocks corresponds here to the reduction factor. If a block contains a portion of the thinned foreground region, the average value of the corresponding pixels of the original documents is formed over this portion and written at the corresponding place in the reduced foreground image. If a block does not contain a thinned foreground region, the value of the foreground image is set equal to zero.

After that, the foreground pixels with values different from zero are expanded with an average value filtration for adjoining pixels.

In the last step, all remaining pixels are filled in. In so doing, the average value of all values not equal to zero is formed. To increase the coding efficiency, a constant gray value is included in the formation of the average value as an additional portion, in order to dampen the foreground image to gray in regions without foreground regions. Newly calculated values are written back directly in the foreground image, as a result of which it is possible to determine all pixels of the image with only one passage.

The determination of the background image corresponds, in principle, to the method, which is used for determining the foreground image, with the exception that the processing is carried out with the complement, the inverse, binary mask image.

Next, all regions belonging to the background, are identified in the binary mask image. Since the border values of the regions have defective intensities or colors, the background regions are also thin by one pixel. However, at least the skeleton of the region is retained.

The original image and the thin, inverse, binary mask image are once again divided into blocks, the edge length of which corresponds now to the reduction factor for the background image. If a block contains a portion of the thinned background region, the average value of the corresponding pixels of the original documents are formed over this portion and into the reduced background image. If a block does not contain any thinned background regions, the corresponding pixel of the background image is set equal to zero.

In the next step, the background pixels with values not equal to zero are expanded with an average value filtration for adjoining pixels.

In the last step, all remaining pixels are filled in. The average value over all values, not equal to zero, is formed in each case here. Newly calculated values are written back directly. As a result, it is possible to determine all pixels of the background image with only one pass.

When all the three images, foreground image, background image and the binary mask image, have been produced according to the inventive method, they are compressed with known image coders.

The decoding consists of decoding the foreground image, the background image and the binary mask image initially separately. The reduced background images and foreground images are enlarged by interpolation to the size of the mask image. Depending on the value of the binary mask image, the reconstructed image is then assembled from the pixels of the enlarged background image and foreground images.

The invention will be described in greater detail in the following by means of an example. In this connection.

Figure 1:
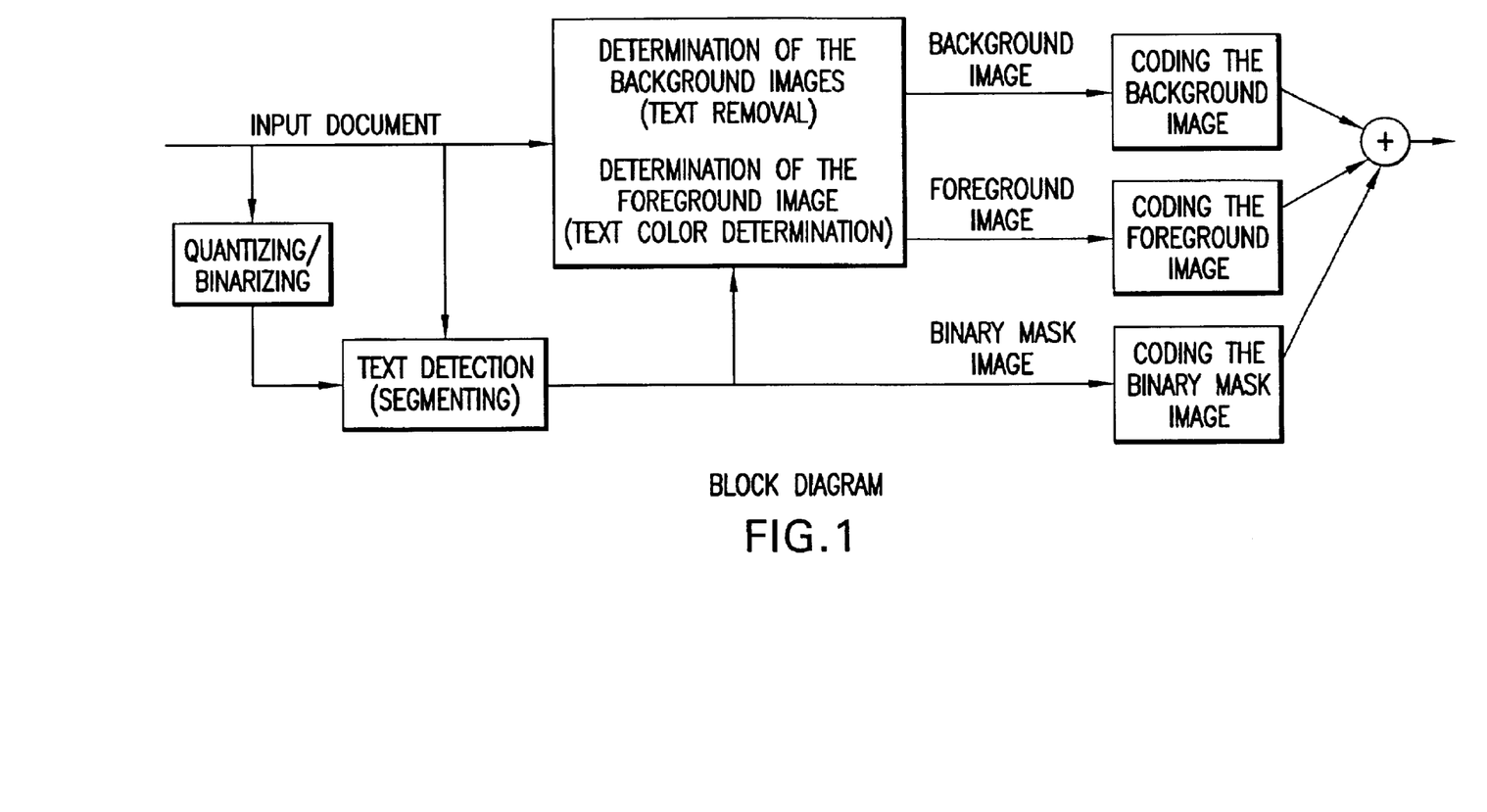
FIG. 1 shows a block diagram of the method.
Figure 2:
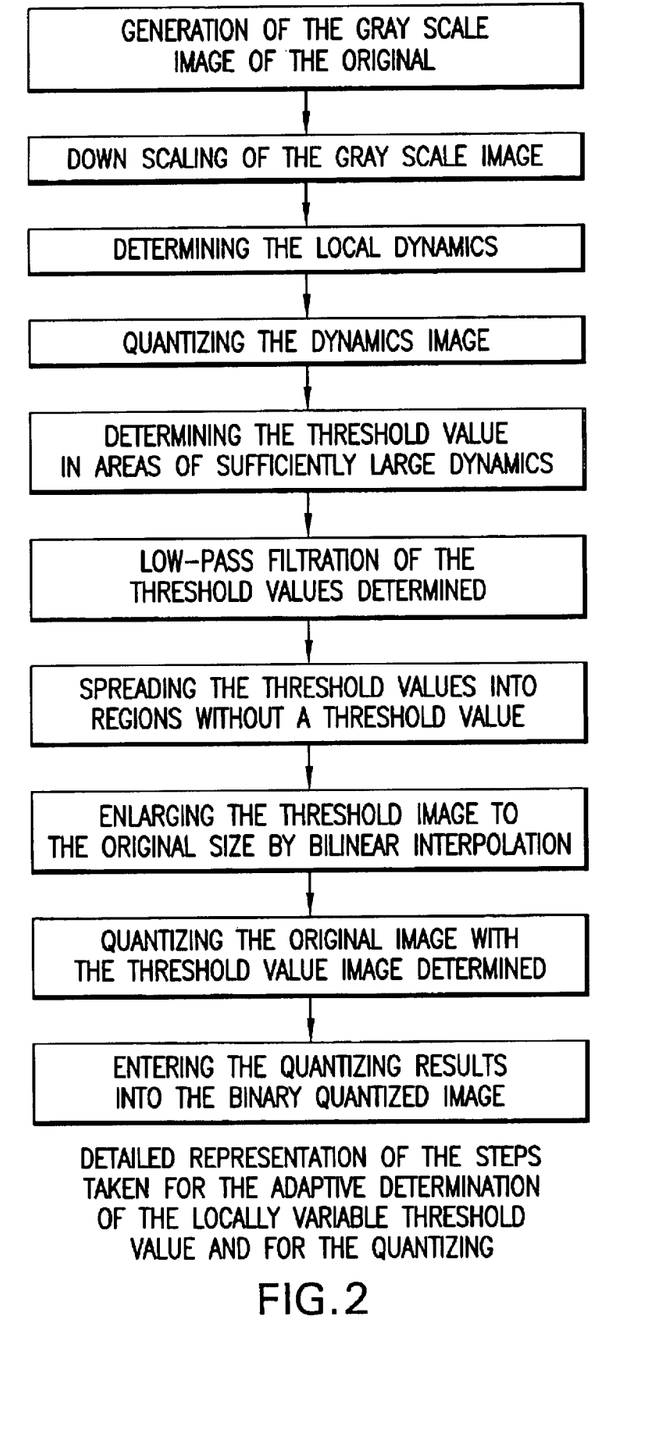
FIG. 2 shows the steps of the method up to the quantizing of the original image with determination of the threshold value.
Figure 6:
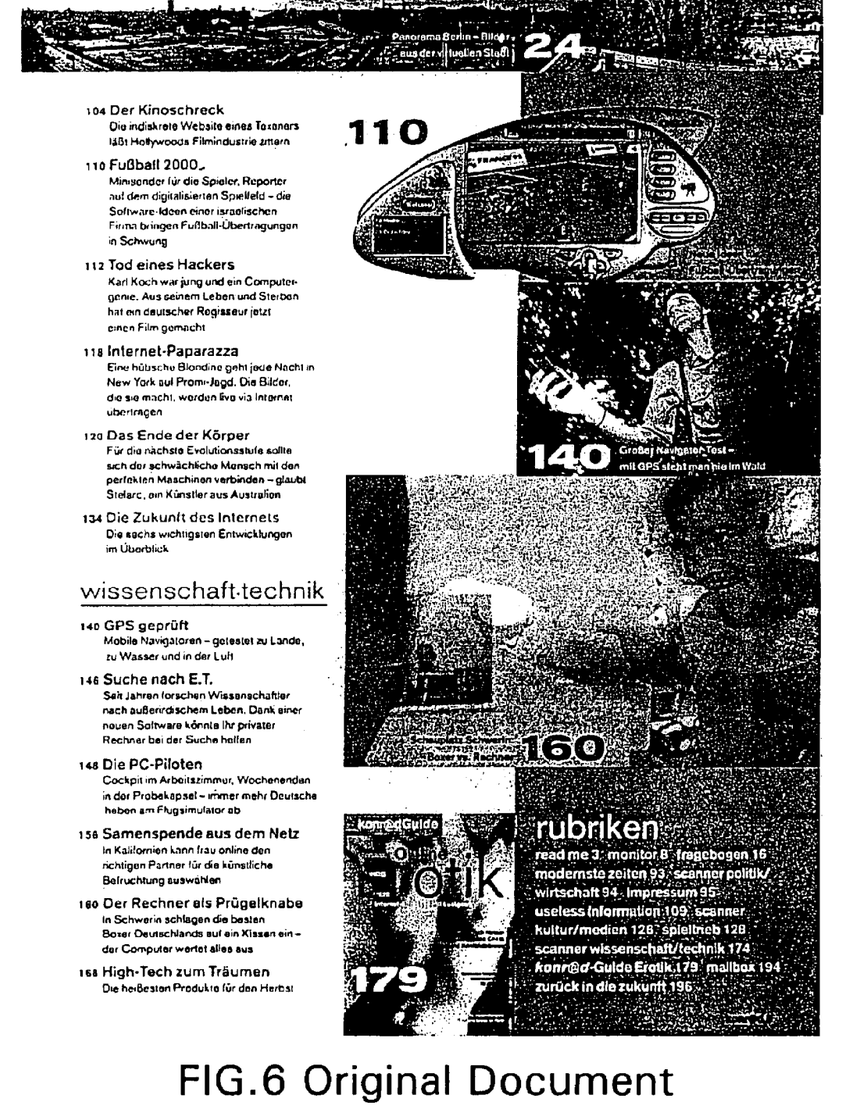
FIG. 6 shows the example of an original document.
Figure 7:
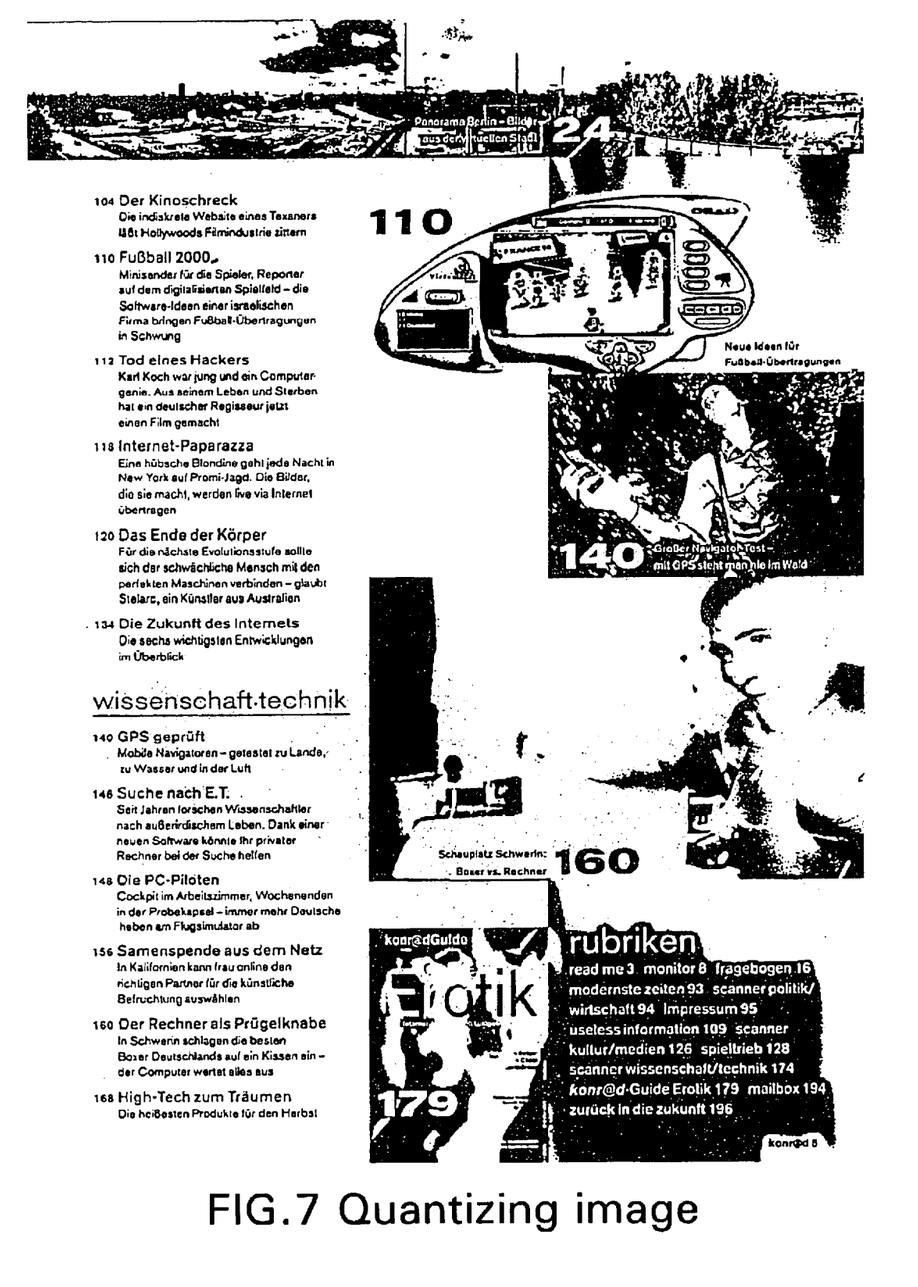
FIG. 7 shows the quantized image of the original document.

In the example, the original document (FIG. 6) is a colored document with black and colored text portions in a resolution of 300 dpi which, to begin with, is converted as shown in FIG. 2 into a gray scale image for determining the locally variable threshold value image and into two color difference component images. The gray scale image is reduced by low-pass filtration with subsequent sub-sampling to 150 dpi. Subsequently, the reduced gray scale image is subjected within the scope of a local dynamics analysis to a maximum/minimum filtration with 3×3 cores. From the difference between the maximum image and the minimum image, a dynamics image results, which is compared in the next step with a minimum dynamics of 55. For areas, which exceed this minimum value, the affiliation to a text region is assumed and a quantizing threshold value is calculated from half the sum of the maximum image and the minimum image. On the other hand, for regions with lesser dynamics, this quantizing threshold value initially is set equal to zero. All threshold values not equal to zero are subsequently subjected to an averaging with a 3×3 core. These averaged threshold values are then expanded with a further 5×5 average value filtration to the adjoining pixels. Pixels, for which there is not yet a threshold value, are subsequently filled in with a 7×7 core. For quantizing, the threshold value image is brought back to the original size by means of bilinear interpolation. By comparing the gray scale image with the threshold value, a binary quantizing image is formed according to FIG. 7 as a basis for the subsequent text detection (segmenting) of FIG. 3.

Figure 3:
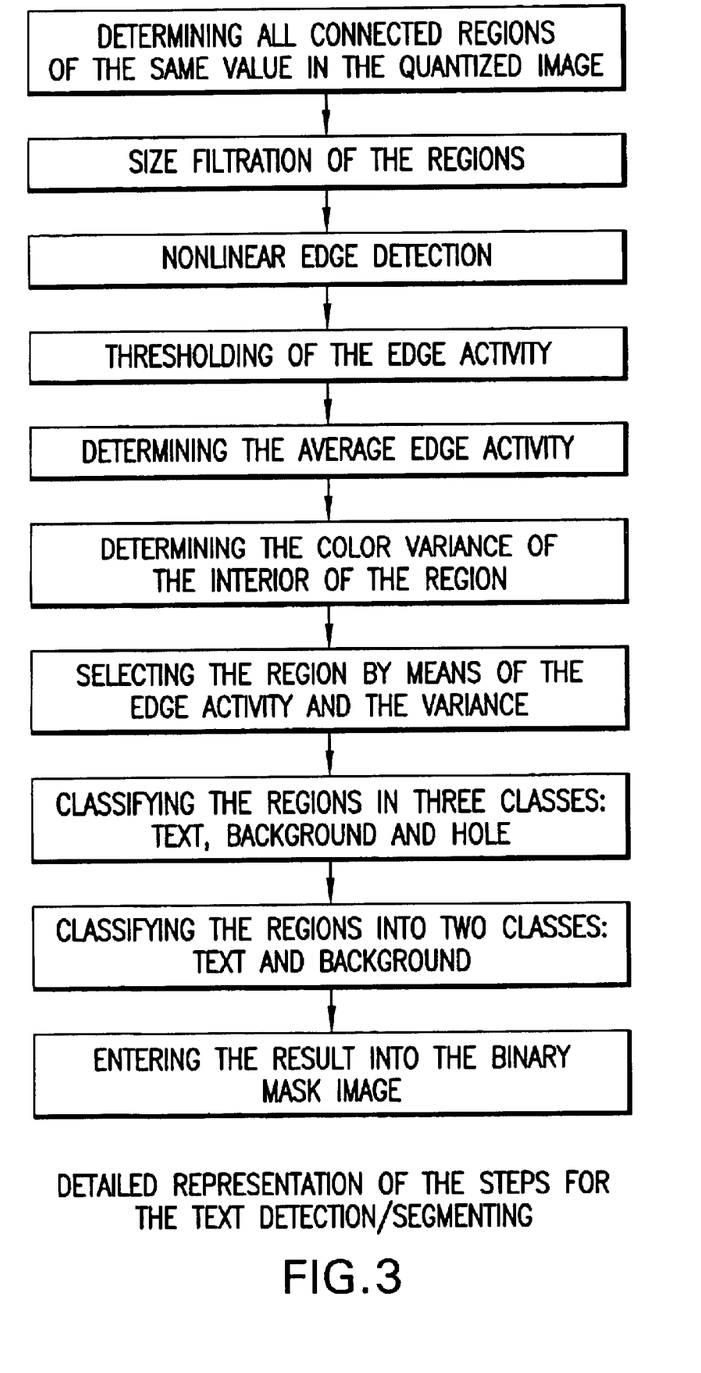
FIG. 3 shows the text detection and segmenting steps of the method.
Figure 8:
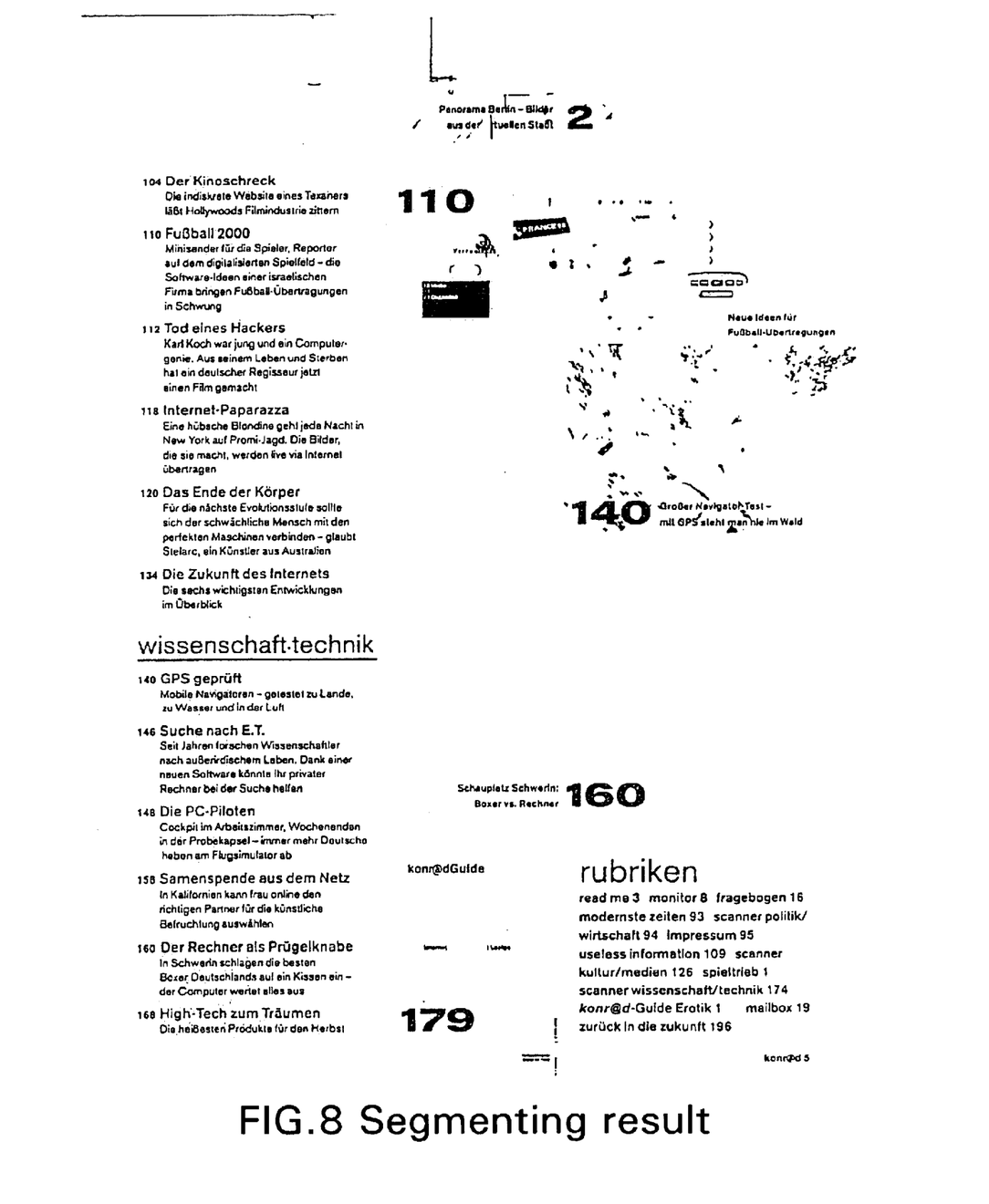
FIG. 8 shows the segmentation result.
Figure 9:
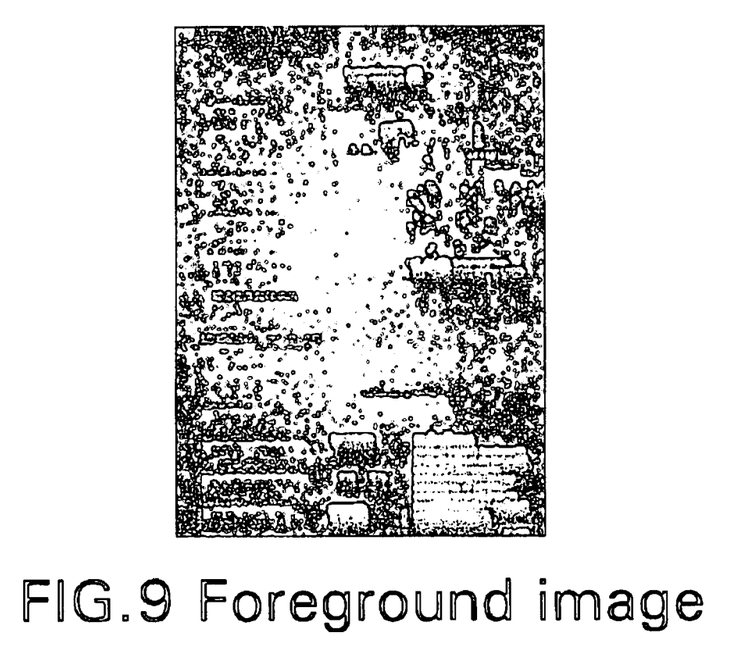
FIG. 9 shows the foreground image of the method.

For this purpose, all connected regions of the quantized image, produced in accordance with FIG. 2, are identified to begin with, a four-fold neighborhood being employed in the example. Within the scope of the subsequent size filtration, a minimum size and a maximum size, the limits of which must not be exceeded, are specified for each of the regions that are to be investigated. Regions outside of this area are subsequently discarded. This is followed by a nonlinear edge detection by investigating all edge pixels of the region in question with the help of a known horizontal and vertical Sobel filter and a Laplace filter. The edge activity determined is compared with a minimum activity value and, if it falls below this value, set equal to zero. The average edge activity and the maximum edge activity, as well as the variance of the inner region, are determined in a next step and subsequently tested to see whether the average edge activity as well as the maximum edge activity are above the specified minimum values and whether the variance of the inner area falls below a maximum value. In the event of a positive result, the actual region is classified as a foreground region and entered in the mask image. If it touches a different foreground region, which has already been entered, it is recorded as a "hole". In the case of a negative result, the region investigated is entered in the mask image as a background region. Subsequently, the classified mask image is binarized in that all foreground regions are set to "black" and the background regions and "holes" are set to "white" (FIG. 8). The example document is segmented according to mode 1.

Figure 4:
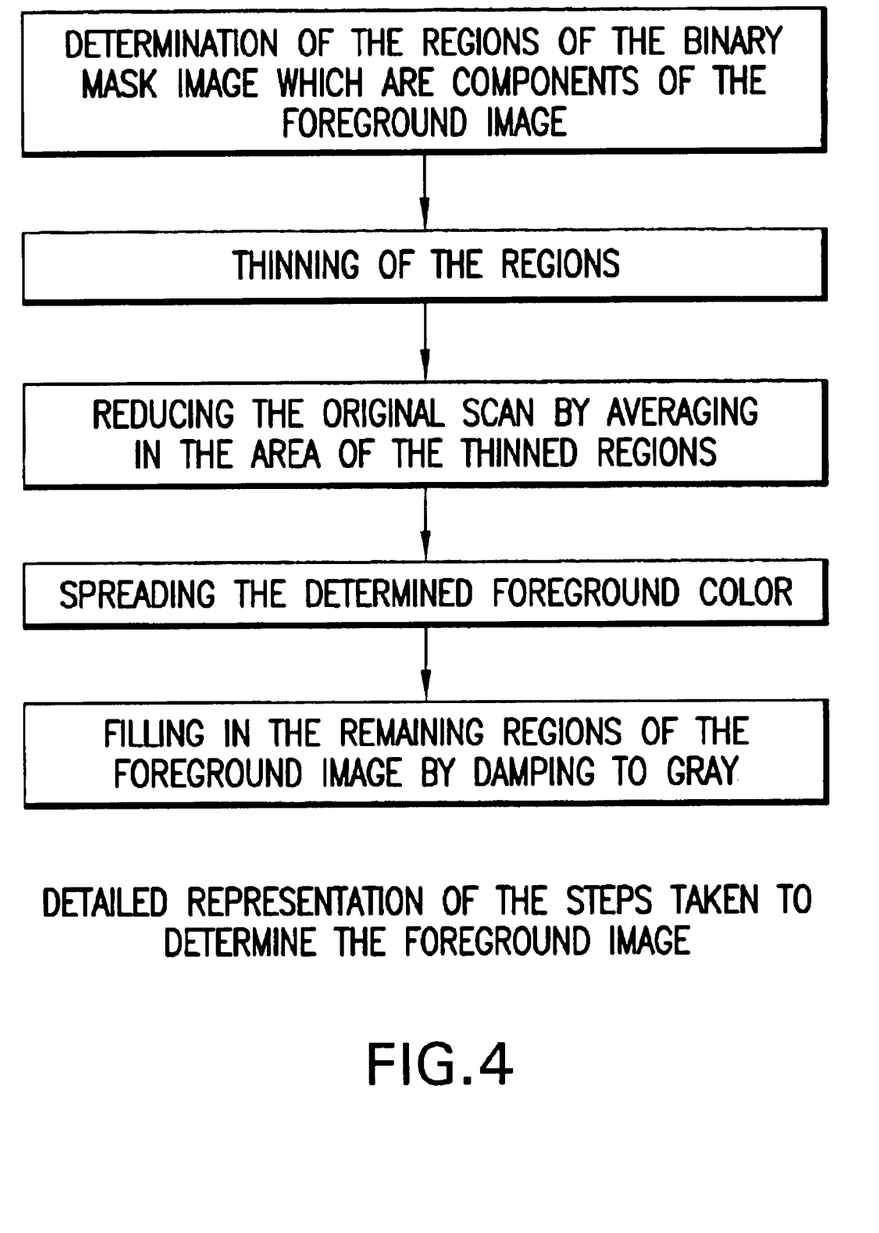
FIG. 4 shows the steps of the method for determining the foreground image.
Figure 5:
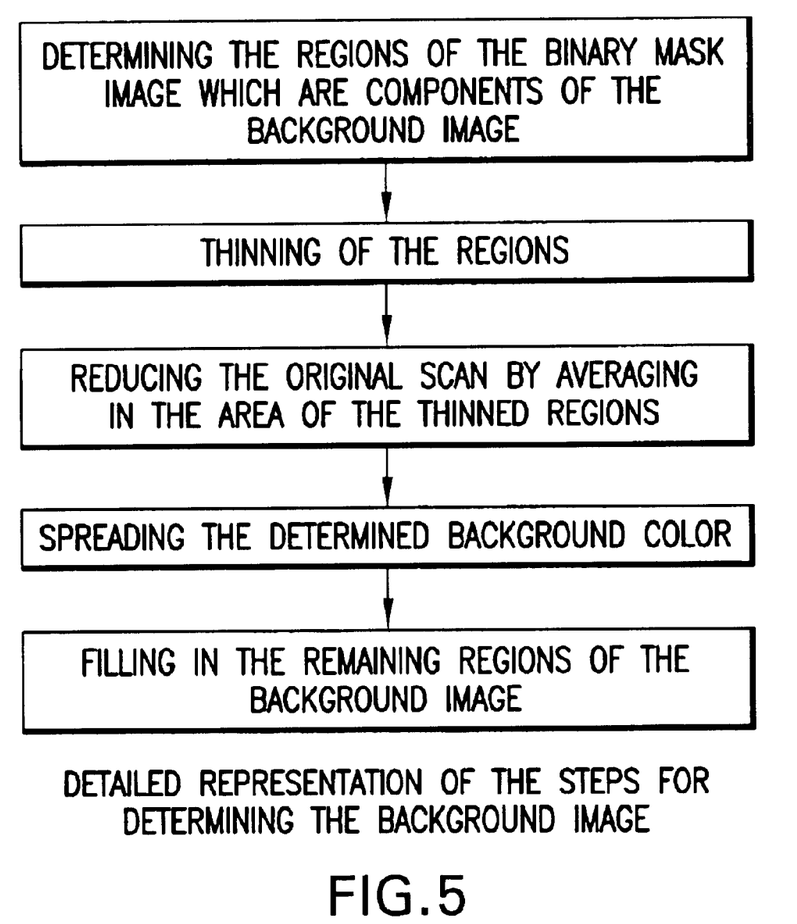
FIG. 5 shows the steps of the method for determining the background image.
Figure 10:
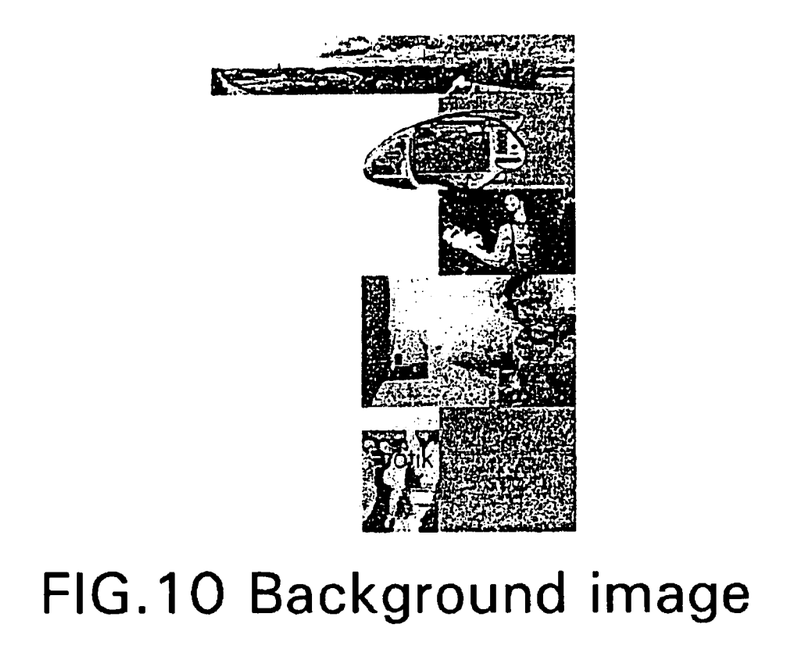
FIG. 10 shows the background image of the method and FIG. 11 shows the decoded reconstruction of the original document.
Figure 11:
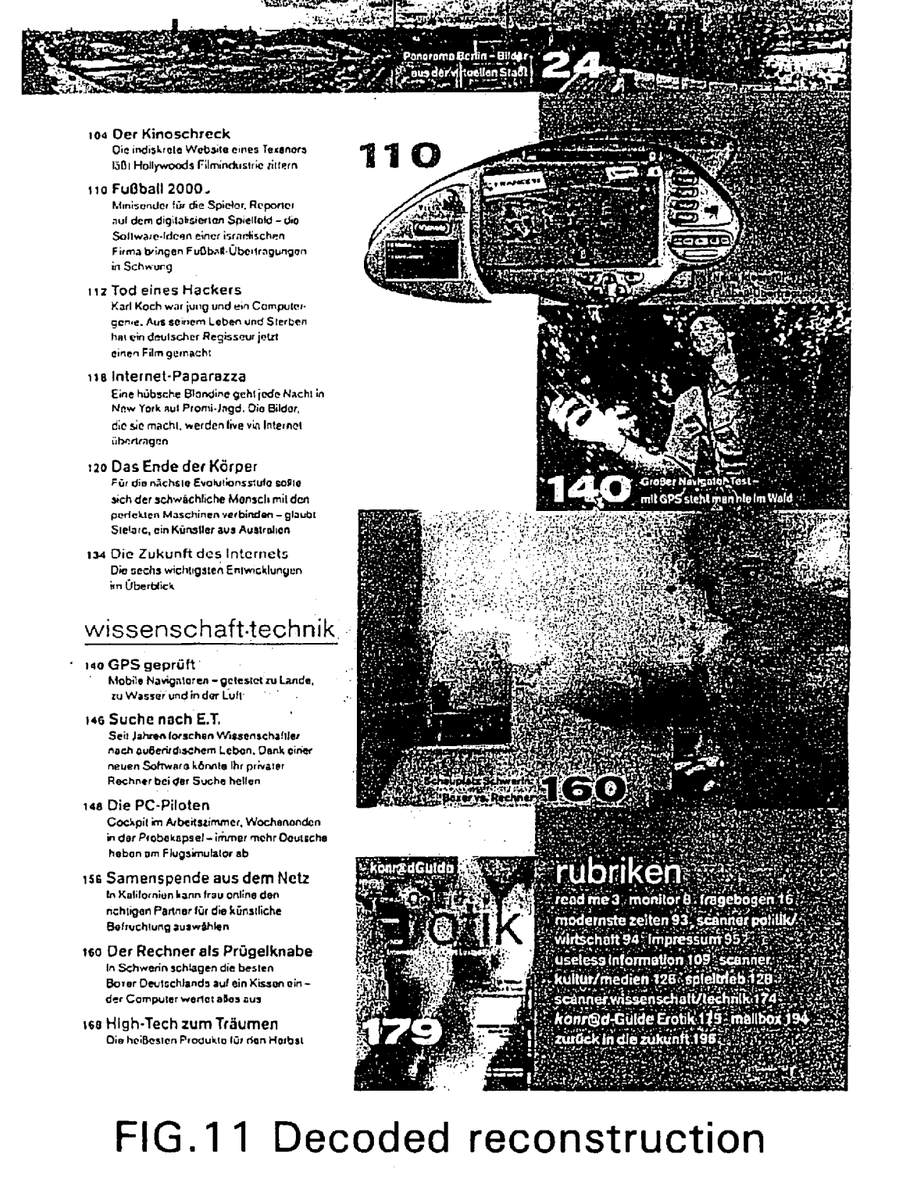

In accordance with FIG. 4, the reduced foreground image is produced from the binary mask image and the original image in that all foreground regions initially are thinned by one pixel and the original is reduced to a third of its size by means of this thinned, binary mask image. For this purpose, the mask image as well as the original image is divided into blocks of 3×3 pixels. Over portions of the thinned foreground region within such a 3×3 block, the average value of these pixels is taken over in the reduced foreground image. If the 3×3 block does not contain any thinned foreground regions, the corresponding pixel is set equal to zero. The foreground pixels with values greater than zero are subsequently expanded with a 5×5 average value filtration and the remaining pixels are filled in with a 5×5 core, a constant gray value being included in the average value formation as an additional portion. For determining the background image of FIG. 5, all regions, belonging to the background are identified in the binary mask image and the background regions are also thinned by one pixel. Subsequently, the original image and thinned mask image are divided into 3×3 blocks. After that, the procedure is continued similarly as in the "Determination of the Foreground Image" step of the method. The result is shown in FIG. 10.

The "foreground", "background" and "binary mask" images, produced according to the example, are subsequently compressed with known image coders, the mask image, for example by means of the "Fax Group 4" coding and the foreground and background images by means of wavelet coding. The three partial images are decoded separately, in that the reduced foreground and background images are brought by linear interpretation to the size of the binary mask image. For a black value, the binary mask image is put together from the pixels of the foreground image and for a white value from the pixels of the background image.

Scanned documents can be compressed with the inventive data compression method presented without being limited by their nature, such as a bright background, rectangular illustrations and exact separation of image components from text components. The expenditure of computing time and the use of storage capacity are furthermore clearly reduced. In addition, different classes of documents and different images can be compressed for the first time by a uniform method.

What is claimed is:

1. A method for compressing scanned, colored and/or gray-scale documents, the digital image of the scanned document being divided into three image planes, a foreground image, a background image and a binary mask image, a locally variable threshold value image being produced from the original document and a bitonal quantized image being produced with the original image by quantizing (binarizing), wherein the quantizing is carried out by means of a defined, reduced original image, a text detection (segmentation) from the quantized image and the original image takes place, which divides the document into foreground and background regions, certain regions, particularly text and graphic elements, are assigned to the foreground image and the text background and images are assigned to the background image, the result of the segmenting is stored in a binary mask image, which is equal in size to the original image, the foreground image, produced from the original image and the mask image with a resolution, which is reduced relative to the original image, describes the color of the foreground regions, the reduced foreground image is produced in that the thinned binary mask image as well as the original image are divided into blocks and the average values of the thinned foreground regions of these blocks are entered in the reduced foreground image and expanded and, subsequently, the regions of the foreground image, which have not yet been determined, are filed in by averaging over the determined regional a constant gray value being included as an additional portion in the averaging, the background image, produced from the original image and the mask image, is produced with a lesser resolution than that of the original image and subsequently the binary mask image, the foreground image and the background image are coded with a known image coder.

2. A method for compressing scanned, colored and/or gray-scale documents, the digital image of the scanned document being divided into three image planes, a foreground image, a background image and a binary mask image, a locally variable threshold value image being produced from the original document and a bitonal quantized image being produced with the origin image by quantizing (binarizing), wherein the quantizing is carried out by means of a defined, reduced original image, a text detection (segmentation) from the quantized image and the original image takes place, which divides the document into foreground and background regions, certain regions, particularly text and graphic elements, are assigned to the foreground image and the text background and images are assigned to the background image, the result of the segmenting is stored in a binary mask image, which is equal in size to the original image, the foreground image, produced from the original image and the mask image with a resolution, which is reduced relative to the original image, describes the color of the foreground regions, the background image, produced from the original image and the mask image, is produced with a lesser resolution tan that of the original image, subsequently the binary mask image, the foreground image and the background image are coded with a known image coder, and the quantizing (binarizing) of the original document takes place in two steps, in that initially, adaptively, a locally variable threshold value is determined from the reduced original value and subsequently compared with the gray value representation in the size of the original document, the colored documents are converted into a gray-scale image and two color difference component images, the gray-scale image is reduced to a suitable size by low-pass filtration with subsequent sub-sampling, a dynamic image is produced by local dynamic analysis of the reduced gray-scale image, the dynamics image is compared with an externally specifiable minimum dynamics, which controls the sensitivity of the quantization and of the text detection (segmentation), when this minimum value is exceeded, a quantizing threshold value is determined from half the sum of the minimum/maximum image, in regions with inadequate dynamics, the quantizing threshold value is set to zero, an average value is formed for all threshold values not equal to zero and the average threshold values, low-pass filtered, are expanded and the threshold value image is enlarged by means of bilinear interpolation and compared with the gray-scale image of the original.

3. A method for compressing scanned, colored and/or gray-scale documents, the digital image of the scanned document being divided into three image planes, a foreground image, a background image and a binary mask image, a locally variable threshold value image being produced from the original document and a bitonal quantized image being produced with the original image by quantizing (binarizing), wherein the quantizing is carried out by means of a defined, reduced original image, a text detection (segmentation) from the quantized image and the original image takes place, which divides the document into foreground and background regions, certain regions, particularly text and graphic elements, are assigned to the foreground image and the text background and images are assigned to the background image, the result of the segmenting is stored in a binary mask image, which is equal in size to the original image, the foreground image, produced from the original image and the mask image with a resolution, which is reduced relative to the original image, describes the color of the foreground regions, the background image, produced from the original image and the mask image, is produced with a lesser resolution than that of the original image, the reduced background image is produced in that the thinned binary background mask image as well as the original image are divided into blocks and the average values of the thinned background regions of these blocks are entered in the reduced background image and expanded and, subsequently, the regions of the background image, which have not yet been determined, are filled in by averaging over the determined regions, and the binary mask image, the foreground image and the background image are coded with a known image coder.

4. The method of claim 2, wherein the reduced foreground image is produced in that the thinned binary mask image as well as the original image are divided into blocks and the average values of the thinned foreground regions of these blocks are entered in the reduced foreground image and expanded and, subsequently, the regions of the foreground image, which have not yet been determined, are filled in by averaging over the determined regions, a constant gray value being included as an additional portion in the averaging.

5. The method of claim 2, wherein the reduced background image is produced in that the thinned binary background mask image as well as the original image are divided into blocks and the average values of the thinned background regions of these blocks are entered in the reduced background image and expanded and, subsequently, the regions of the background image, which have not yet been determined, are filled in by averaging over the determined regions.

6. The method of claim 2, wherein the gray-scale image is reduced to half the original by low-pass filtering and, within the scope of a local dynamics analysis, subjected to a maximum/minimum filtration with 3×3 cores, the threshold values, averaged with 3×3 cores, are expanded to the adjoining pixels with a further 5×5 average value-filtration and the regions without a threshold value are subsequently filled in with a 7×7 core.

7. The method of claim 1, wherein the binary mask image and the original image are divided into blocks, 3×3 pixels in size, for every block, the average value of those pixels of the original image is formed, which belong to the thinned foreground or background region, the foreground and background pixel intensities determined are expanded to the adjoining pixels with a 5×5 average value filter a the remaining pixels are filled in with a further 5×5 average value filter, a constant gray value being included in the average value filtration for the foreground image.

8. The method of claim 3, wherein the binary mask image and the original image are divided into blocks, 3×3 pixels in size, for every block, the average value of those pixels of the original image is formed, which belong to the thinned foreground or background region, the foreground and background pixel intensities determined are expanded to the adjoining pixels with a 5×5 average value filter and the remaining pixels are filled in with a further 5×5 average value filter, a constant gray value being included in the average value filtration for the foreground image.

9. The method of claim 2, wherein the binary quantizing image and the original image are subjected to a text detection (segmenting), for which purpose all connected regions of a permissible size area are selected, all connected regions of the quantizing image of the same value are evaluated with regard to their suitability as foreground components, the regions, segmented as foreground, are entered into the binary mask image, the segmenting can be carried out according to four different modes, depending on the type of document and the binary mask image, produced as a result of the segmenting, makes possible a pixel-by-pixel assignment of all document areas into foreground and background regions.

10. A method for compressing scanned, colored and/or gray-scale documents, the digital image of the scanned document being divided into three image planes, a foreground image, a background image and a binary mask image, a locally variable threshold value image being produced from the original document and a bitonal quantized image being produced with the original image by quantizing (binarizing), wherein the quantizing is carried out by means of a defined, reduced original image, a text detection (segmentation) from the quantized image and the original image takes place, which divides the document into foreground and background regions, certain regions, particularly text and graphic elements, are assigned to the foreground image and the text background and images are assigned to the background image, the result of the segmenting is stored in a binary mask image, which is equal in size to the original image, the foreground image, produced from the original image and the mask image with a resolution, which is reduced relative to the original image, describes the color of the foreground regions, the gray-scale image is reduced to half the original by low-pass filtering and, within the scope of a local dynamics analysis, subjected to a maximum/minimum filtration with 3×3 cores, the threshold values, averaged with 3×3 cores, are expanded to the adjoining pixels with a further 5×5 average value-filtration and the regions without a threshold value are subsequently filled in with a 7×7 core, the background image, produced from the original image and the mask image, is produced with a lesser resolution than that of the original image and the binary mask image, the foreground image and the background image are coded with a known image coder.

11. A method for compressing scanned, colored and/or gray-scale documents, the digital image of the scanned document being divided into three image planes, a foreground image, a background image and a binary mask image, a locally variable threshold value image being produced from the original document and a bitonal quantized image being produced with the original image by quantizing (binarizing) wherein the quantizing is carried out by means of a defined, reduced original image, all regions of the quantized image are subjected consecutively to an examination, the connected regions of the quantized image of equal value are subjected to a size filtration, which eliminates very small and very large regions, the edges of the regions are subjected to an edge activity testing, which eliminates regions with a low edge activity, the inner area of the regions is subjected to a variance determination, which eliminates regions with a high variance, the regions obtained are classified as foreground, provided they do not touch any other text region, a text detection (segmentation) from the quantized image and the original image takes place, which divides the document into foreground and background regions, the binary quantizing image and the original image are subjected to a text detection (segmentation), for which purpose all connected regions of a permissible size area are selected, all connected regions of the quantizing image of the same value are evaluated with regard to their suitability as foreground components, the regions, segmented as foreground, are entered into the binary mask image, the segmenting can be carried out according to four different modes, depending on the type of document, the binary mask image, produced as a result of the segmenting, makes possible a pixel-by-pixel assignment of all document areas into foreground and background regions, certain regions, particularly text and graphic elements, are assigned to the foreground image and the text background and images are assigned to the background image, the result of the segmenting is stored in a binary mask image, which is equal in size to the original image, the foreground image, produced from the original image and the mask image with a resolution, which is reduced relative to the original image, describes the color of the foreground regions, the background image, produced from the original image and the mask image, is produced with a lesser resolution than that of the original image and the binary mask image, the foreground image and the background image are coded with a known image coder.

12. A method for compressing scanned, colored and/or gray-scale documents, the digital image of the scanned document being divided into three image planes, a foreground image, a background image and a binary mask image, a locally variable threshold value image being produced from the original document and a bitonal quantized image being produced with the original image by quantizing (binarizing), wherein, the quantizing is carried out by means of a defined, reduced original image, the binary mask image and the original image are divided into blocks, 3×3 pixels in size, for every block, the average value of those pixels of the original image is formed, which belong to the thinned foreground or background region, the foreground and background pixel intensities determined are expanded to the adjoining pixels with a 5×5 average value filter and the remaining pixels are filled in with a further 5×5 average value filter, a constant gray value being included in the average value filtration for the foreground image, a text detection (segmentation) from die quantized image and the original image takes place, which divides the document into foreground and background regions, certain regions, particularly text and graphic elements, are assigned to the foreground image and the text background and images are assigned to the background image, the result of the segmenting is stored in a binary mask image, which is equal in size to the original image, the foreground image, produced from the original image and the mask image with a resolution, which is reduced relative to the original image, describes the color of the foreground regions, the background image, produced from the original image and the mask image, is produced with a lesser resolution than that of the original image and the binary mask image, the foreground image and the background image are coded with a known image coder.

13. A method for compressing scanned, colored and/or gray-scale documents, the digital image of the scanned document being divided into three image planes, a foreground image, a background image and a binary mask image, a locally variable threshold value image being produced from the original document and a bitonal quantized image being produced with the original image by quantizing (binarizing), wherein

- the quantizing is carried out by means of a defined, reduced original image,
- the binary quantizing image and the original image are subjected to a text detection (segmenting), for which purpose all connected regions of a permissible size area are selected,
- all connected regions of the quantizing image of the same value are evaluated with regard to their suitability as foreground components,
- the regions, segmented as foreground, are entered into the binary mask image,
- the segmenting can be carried out according to four different modes, depending on the type of document and
- the binary mask image, produced as a result of the segmenting, makes possible a pixel-by-pixel assignment of all document areas into foreground and background regions,
- a text detection (segmentation) from the quantized image and the original image takes place, which divides the document into foreground and background regions,
- certain regions, particularly text and graphic elements, are assigned to the foreground image and the text background and images are assigned to the background image,
- the result of the segmenting is stored in a binary mask image, which is equal in size to the original image,
- the foreground image, produced from the original image and the mask image with a resolution, which is reduced relative to the original image, describes the color of the foreground regions,
- the reduced foreground image is produced in that the thinned binary mask image as well as the original image are divided into blocks and the average values of the thinned foreground regions of these blocks are entered in the reduced foreground image and expanded and, subsequently, the regions of the foreground image, which have not yet been determined, are filled in by averaging over the determined regions, a constant gray value being included as an additional portion in the averaging,
- the background image, produced from the original image and the mask image, is produced with a lesser resolution than that of the original image and
- the binary mask image, the foreground image and The background image are coded with a known image coder.

14. A method for compressing scanned, colored and/or gray-scale documents, the digital image of the scanned document being divided into three image planes, a foreground image, a background image and a binary mask image, a locally variable threshold value image being produced from the original document and a bitonal quantized image being produced with the original image by quantizing (binarizing), wherein

- the quantizing is carried out by means of a defined, reduced original image,
- the binary quantizing image and the original image are subjected to a text detection (segmenting), for which purpose all connected regions of a permissible size area are selected,
- all connected regions of the quantizing image of the same value are evaluated with regard to their suitability as foreground components,
- the regions, segmented as foreground, are entered into the binary mask image,
- the segmenting can be carried out according to four different modes, depending on the type of document and
- the binary mask image, produced as a result of the segmenting, makes possible a pixel-by-pixel assignment of all document areas into foreground and background regions,
- a text detection (segmentation) from the quantized image and the original image takes place, which divides the document into foreground and background regions,
- certain regions, particularly text and graphic elements, are assigned to the foreground image and the text background and images are assigned to the background image,
- the result of the segmenting is stored in a binary mask image, which is equal in size to the original image,
- the foreground image, produced from the original image and the mask image with a resolution, which is reduced relative to the original image, describes the color of the foreground regions,
- the background image, produced from the original image and the mask image, is produced with a lesser resolution than that of the original image and
- the binary mask image, the foreground image and the background image are coded with a known image coder wherein, the reduced background image is produced in that the thinned binary background mask as well as the original image are divided into blocks and the average values of the thinned background regions of these blocks are entered in the reduced background image and expanded and, subsequently, the regions of the background image, which have not yet been determined, are filled in by averaging over the determined regions.

* * * * *